United States Patent
Marsolek et al.

(10) Patent No.: US 12,050,462 B2
(45) Date of Patent: Jul. 30, 2024

(54) ON-MACHINE REMOTE CONTROL

(71) Applicant: Caterpillar Paving Products Inc., Brooklyn Park, MN (US)

(72) Inventors: John L. Marsolek, Watertown, MN (US); Jacob J. McAlpine, Otsego, MN (US); Nathaniel S Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 200 days.

(21) Appl. No.: 17/489,368

(22) Filed: Sep. 29, 2021

(65) Prior Publication Data

US 2023/0094845 A1    Mar. 30, 2023

(51) Int. Cl.
| | | |
|---|---|---|
| *G05D 1/00* | (2024.01) | |
| *E02F 9/20* | (2006.01) | |
| *E02F 9/26* | (2006.01) | |
| *G05B 15/02* | (2006.01) | |

(52) U.S. Cl.
CPC ......... *G05D 1/0038* (2013.01); *E02F 9/2004* (2013.01); *E02F 9/262* (2013.01); *G05B 15/02* (2013.01); *G05D 1/0016* (2013.01); *G05D 1/0022* (2013.01); *G05D 1/0027* (2013.01)

(58) Field of Classification Search
CPC .............. G05D 1/0038; G05D 1/0016; G05D 1/0022; G05D 1/0027; E02F 9/2004; E02F 9/262; G05B 15/02
See application file for complete search history.

(56) References Cited

U.S. PATENT DOCUMENTS

| | | | |
|---|---|---|---|
| 7,347,621 B2 | 3/2008 | Sri-Jayantha et al. | |
| 7,398,137 B2 | 7/2008 | Ferguson et al. | |
| 8,116,990 B2 | 2/2012 | Koul | |
| 8,897,973 B2 | 11/2014 | Hunt et al. | |
| 9,527,211 B2 | 12/2016 | Posselius et al. | |
| 10,311,526 B2 | 6/2019 | Takeda | |
| 10,663,955 B2 | 5/2020 | Kuikka | |
| 2005/0060066 A1* | 3/2005 | Buehler | G05D 1/0038 |
| | | | 701/2 |
| 2005/0075823 A1 | 4/2005 | Park | |

(Continued)

FOREIGN PATENT DOCUMENTS

DE    102018217716 A1    5/2019

OTHER PUBLICATIONS

German Office Action for Germany Patent Appln. No. 10 2022 125 032.6, mailed Sep. 14, 2023 (10 pgs).

*Primary Examiner* — Anne Marie Antonucci
*Assistant Examiner* — Jingli Wang

(57) ABSTRACT

Non-line of sight (NLOS) remote control for machines is accomplished by a remote-control station with cellular connectivity to run multiple machines remotely. However, NLOS is expensive and may not work in areas with low cell tower coverage. Accordingly, the present disclosure pertains to providing on-machine remote control to operators of machines at a worksite. The on-machine remote control allows one machine to actively control another machine through connectivity between those two machines. For example, a tractor operator may use on-machine remote control to take control of a compactor, such that the compactor may be run using the tractor controls.

20 Claims, 5 Drawing Sheets

(56) References Cited

U.S. PATENT DOCUMENTS

2014/0214240 A1\* 7/2014 Funke .................. G05D 1/0027
  701/2
2014/0257527 A1   9/2014 Chinesta et al.
2017/0342684 A1  11/2017 Sherlock \* cited by examiner

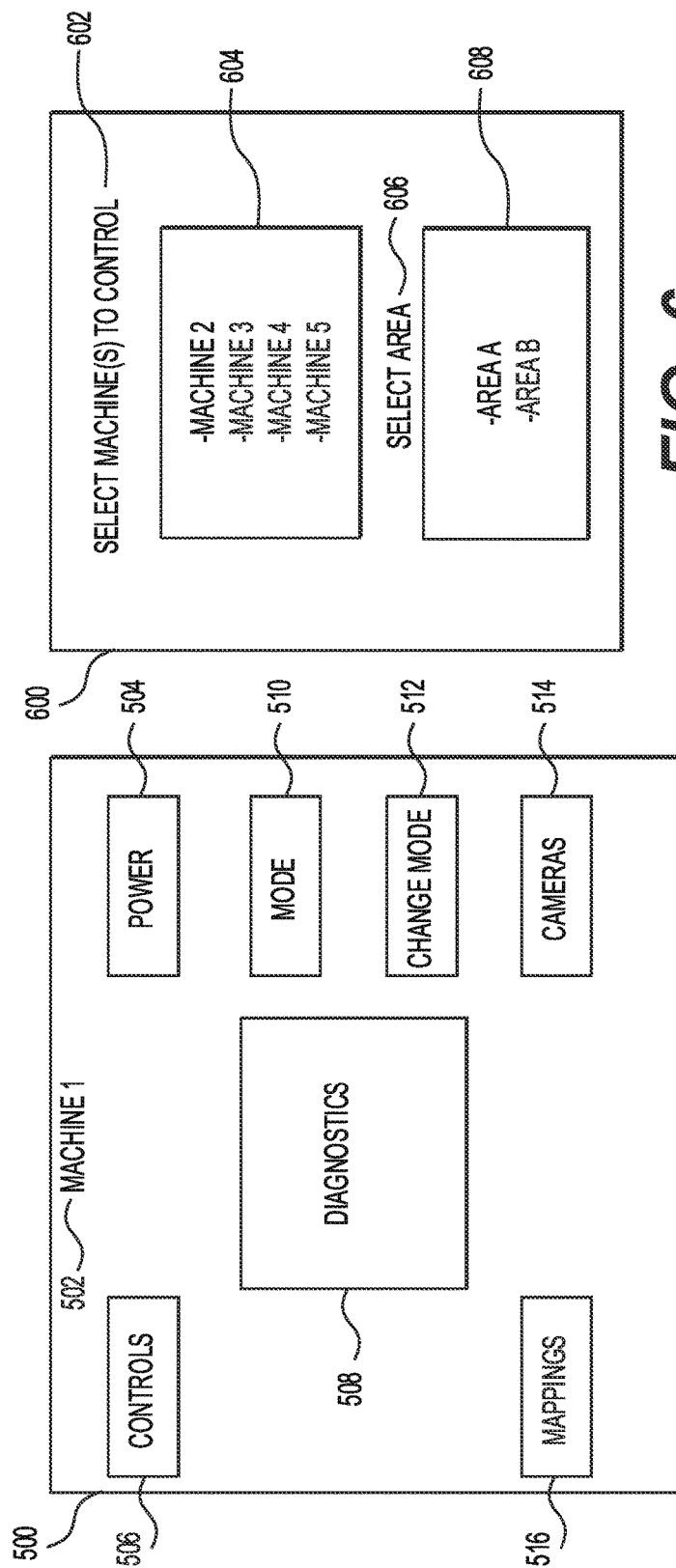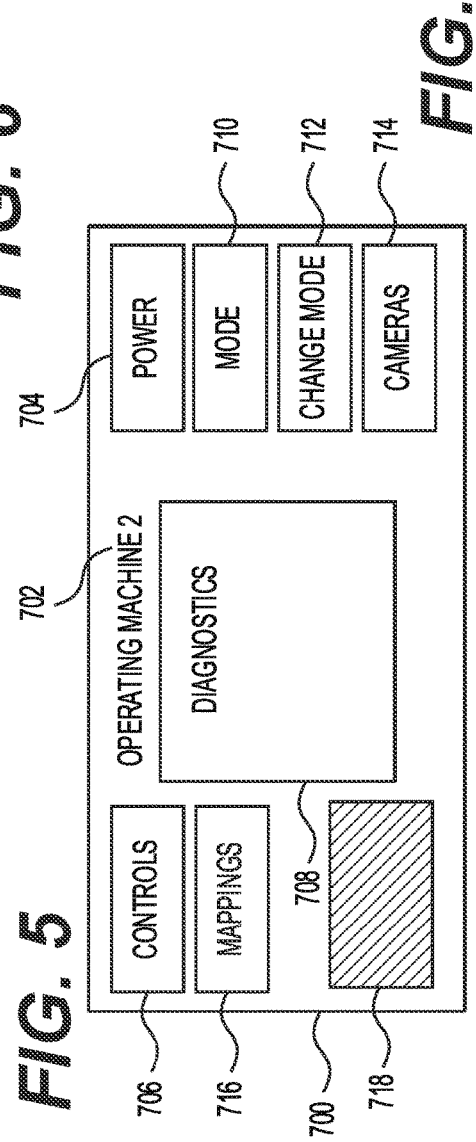

ON-MACHINE REMOTE CONTROL

TECHNICAL FIELD

The present disclosure is related to non-line of sight (NLOS) remote control for machines. More specifically, the present disclosure relates to a system and method for integrating a NLOS system onto a machine to provide on-machine remote control at a worksite. Additionally, the present disclosure relates to systems and methods of enabling an operator of a first machine at a worksite to actively control a second machine at the worksite through connectivity between those two machines.

BACKGROUND

Excavation machines, loading machines, hauling machines, compacting machines, and other machines are often used to perform a variety of tasks at a worksite. For example, one or more dozers are used to remove a layer of gravel, concrete, asphalt, soil, or other material making up part of a work surface at the worksite. In some examples, a dozer forms a mound or pile of the removed material at a first location of the work site, and a wheel loader or other loading machine is configured to move the pile of removed material from the first location to a dump zone, a hauling machine, or any other second location at the worksite. In such examples, the compactor is controlled (e.g., manually by an operator, remotely by an operator that has the machine within their line of site (LOS), remotely by an operator located at a NLOS station with respect to the machine, etc.) to traverse a travel path defined by the work surface and extending from a current location of the compactor to the location of the work area.

In instances where LOS remote control is used, an operator is at a location on a worksite where the machine(s) being controlled are within the operator's line of site. The operator can use a computing device that enables them to remotely control the machine while not inside the machine. In instances where NLOS remote control for machines is used, the NLOS is accomplished by using a NLOS station that is at a particular location on a worksite. The NLOS station requires various monitors and servers, as well as a structure to house the equipment and operators. The NLOS also utilizes wireless and/or cellular connectivity to run multiple machines at a worksite remotely. The NLOS station includes individual remote-control mode switch to allow a machine to enter in remote control mode and changes the controls of the remote-control station to the machine that is active. However, due to the large amount of infrastructure required to implement a NLOS station on a worksite, NLOS stations may not be suitable for some projects where budget is a concern, or for worksites that lack available space for the NLOS station.

Additionally, not all worksites can accommodate an NLOS station. In instances where a machine is being operated remotely by an operator at a NLOS location with respect to the machine, communications between the operator at the NLOS location and the machine rely on a cellular communication network. However, many worksites are located in areas where cell service is limited or may not be available at all. This results in spotty service for signals sent between the NLOS station and machine(s) on the worksite, which can result in worksite delays or increase of errors. In instances where there is no cell service available, the NLOS station is not be able to be used at all, resulting in worksite machines being operated manually. This can increase manpower required, costs, and more for a project.

An example system for a coordinated multi-vehicle grade control is described in U.S. Patent Application Publication No. 2017/034268 (hereinafter referred to as the '268 reference). In particular, the '268 reference describes a coordinated grade control system and method that facilitates control for actuating (i.e., moving, re-orienting, etc.) implements of different work vehicles at a worksite. A first work vehicle can receive a first grading signal and processes, using a first onboard controller, the first grading control signal to determine how to orient the first grading implement during a first grading pass. A second work vehicle receives a second grading control signal, which is processed by the second onboard controller, to determine how to orient the second grading implement of the second work vehicle. The second grading control signal can be based on the first grading control signal to coordinate the orientation of the first grading implement with respect to the second grading implement along the grading pass. The first work vehicle can also generate control signals to instruct the second work vehicle how to orient the second grading implement. The first vehicle can generate the control signals based on a stored computerized model of a worksite and the work to be performed at the worksite using the grading implements.

The system described in the '268 reference does not, however, enable an operator of a first machine to fully remotely control a second, different machine (e.g., control entire machine) using connectivity between the two machines. For example, the system described in the '268 reference does not facilitate mapping controls of a first machine to the controls of a second such that an operator of the first machine can remotely control the second machine using the first machine's controls. As a result, using the system described in the '268 reference to remotely control various machines at a worksite can be inefficient.

Example embodiments of the present disclosure are directed toward overcoming the deficiencies described above.

SUMMARY OF THE INVENTION

In an example of the present disclosure, a method includes receiving, by a first controller of a first machine disposed at a worksite, a first input indicating a request to change from a first operating mode in which the first controller is operable to control the first machine to a second operating mode in which the first controller is operable to remotely control a machine disposed at the worksite other than the first machine. The first controller causes, based on the first input, a display of the first machine to present first information indicating one or more additional machines disposed at the worksite. The method also includes receiving, by the first controller, a second input indicating a selection of a second machine from the one or more additional machines. The first controller operates in the second operating mode and causes, based on the second input, the display of the first machine to present second information captured by a device of the second machine. The method further comprises receiving, by the first controller, while operating in the second operating mode, and via a control of the first machine, a third input indicating a desired operation of the second machine, the control of the first machine being configured to control an operation of the first machine while the first controller is operating in the first operating mode. The first controller generates, based on the third input, first instructions configured to cause the second machine to perform the desired operation. The method further comprises sending, by the first controller and via a network, the first instructions to a second controller of the second machine, wherein execution of the first instructions by the second controller causes the second machine to perform the desired operation.

In another example of the present disclosure, a system includes a first machine disposed at a worksite. The first machine includes a first controller, a display operably connected to the first controller, and a first control operably connected to the first controller, the first control being configured to direct input to the first controller in response to manual manipulation. The system also includes a second machine disposed at the worksite, the second machine including a second controller, and a communication network configured to transmit signals between the first controller and the second controller. The first controller is configured to receive a first input indicating a first request to change from a first operating mode to a second operating mode, cause, based on the first input, the display of the first machine to present first information indicating one or more additional machines disposed at the worksite, receive a second input indicating a selection of the second machine from the one or more additional machines, cause, while operating in the second operating mode and based on the second input, the display of the first machine to present second information captured by a device of the second machine, receive, while operating in the second operating mode and via a control of the first machine, a third input indicating a desired operation of the second machine, the control of the first machine being configured to control an operation of the first machine in the first operating mode, generate, based on the third input, first instructions configured to cause the second machine to perform the desired operation, and send, via the communication network, the first instructions to the second controller, wherein execution of the first instructions by the second controller causes the second machine to perform the desired operation.

In yet another example of the present disclosure, a machine is moveable along a work surface of a worksite and comprises a frame; a power source supported by the frame; a work tool coupled to the frame and configured to perform a task at the worksite; a controller operably connected to the power source; a display operably connected to the controller; a communication device operably connected to the controller and communicatively connected to a network; and one or more non-transitory computer-readable media storing instructions. The instructions, when executed by the controller, cause the controller to perform acts comprising receiving a first input indicating a first request to change from a first operating mode to a second operating mode. The controller causes, based on the first input, the display to present first information indicating one or more additional machines disposed at the worksite. The controller receives a second input indicating a selection of a second machine from the one or more additional machines and causes, while operating in the second operating mode and based on the second input, the display to present second information received from the second machine. The controller receives, while operating in the second operating mode and via a control of the machine, a third input indicating a desired operation of the second machine, the control of the machine being configured to control a corresponding operation of the machine in the first operating mode. The controller generates, based on the third input, first instructions configured to cause the second machine to perform the desired operation and sends, via the network, the first instructions to a second controller of the second machine, wherein execution of the first instructions by the second controller causes the second machine to perform the desired operation.

BRIEF DESCRIPTION OF THE DRAWINGS

FIG. 5 is an illustration of an example user interface associated with the system shown in FIG. 1.

FIG. 6 is an illustration of another example user interface associated with the system shown in FIG. 1.

FIG. 7 is an illustration of still another example user interface associated with the system shown in FIG. 1.

DETAILED DESCRIPTION

Wherever possible, the same reference numbers will be used throughout the drawings to refer to the same or like parts.

Figure 1:
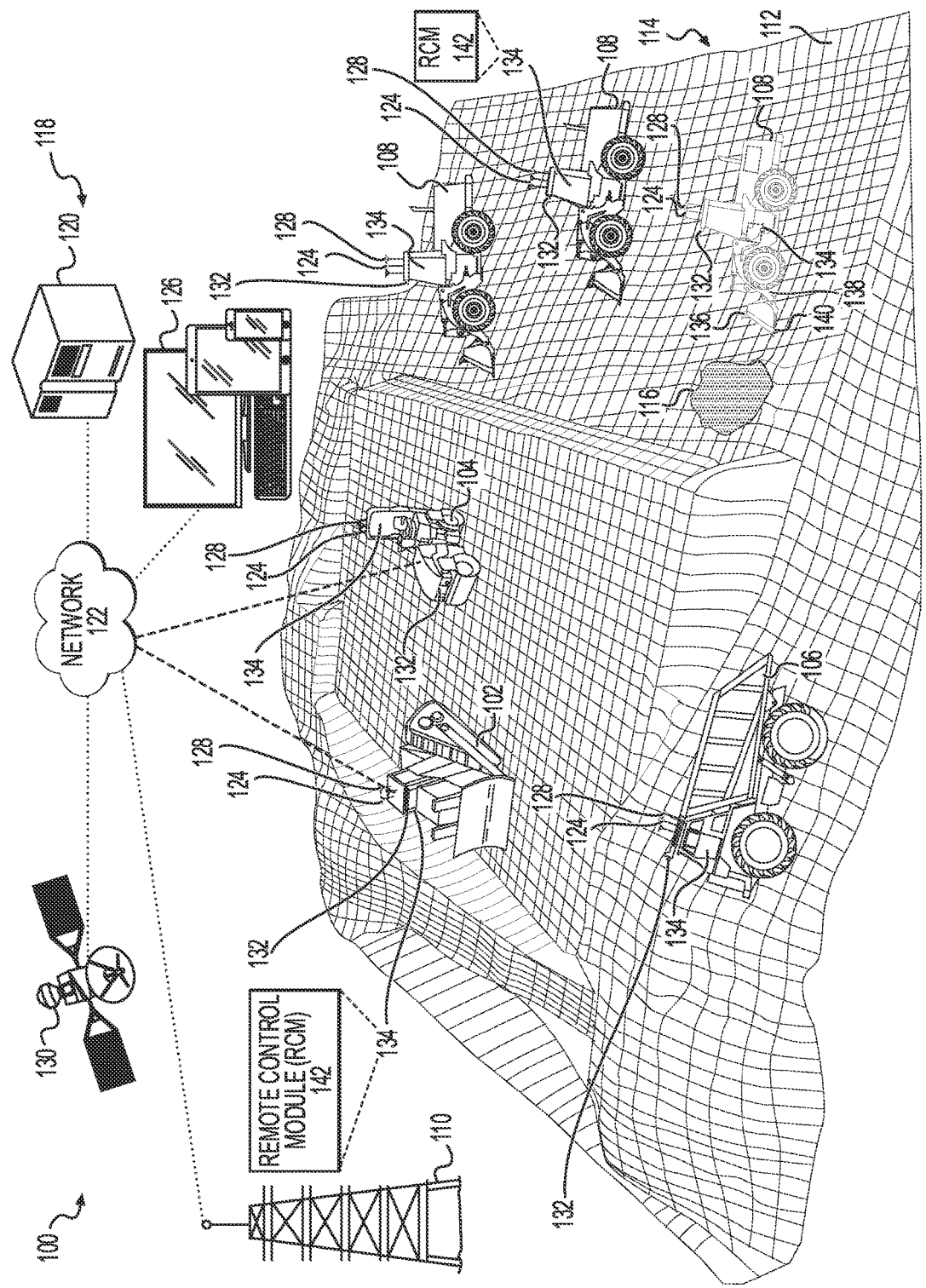
FIG. 1 is a schematic illustration of a system in accordance with an example of the present disclosure.

Referring to FIG. 1, an example system 100 includes one or more machines 102, 104, 106, 108, moveable along a work surface of a worksite 114 to perform various tasks at the worksite 114. For example, the system 100 shown in FIG. 1 includes one or more digging machines 102, one or more compacting machines 104, one or more hauling machines 106, one or more loading machines 108, and/or other types of machines used for construction, mining, paving, grading, excavation, and/or other operations at the worksite 114. Each of the machines described herein includes a frame, one or more engines (e.g., diesel engines), battery packs, fuel cells, or other power sources supported by the frame and configured to drive and/or otherwise provide power to various components of the machines, and a display operably connected to a controller 134. In such examples, a power source of a particular machine may provide power to drive movement of the machine along the work surface of the worksite 114. Such power sources may also provide power to energize, drive, activate, and/or otherwise operate various parasitic loads (e.g., hydraulic cylinders/systems, cooling systems, electronic systems, pneumatic systems, etc.) of the machine. Each of the machines described herein are in communication with each other and/or with a local or remote system 118 by way of a network 122. The network 122 facilitates wireless communication between the machines described herein and/or between controllers 134 of such machines and, for example, a system controller 120 of the control system 118, for the purpose of transmitting and/or receiving operational data. The network 122 can also facilitate direct wireless communication between a controller 134 of a first machine, such as digging machine 102, and a controller 134 of a second machine, such as compacting machine 104 for the purpose of transmitting and/or receiving operational data and/or instructions.

A digging machine 102 refers to any machine that reduces material at the worksite 114 for the purpose of subsequent operations (i.e., for blasting, loading, hauling, and/or other operations). Examples of digging machines 102 include excavators, backhoes, dozers, drilling machines, trenchers, and drag lines, among other types of digging machines. Multiple digging machines 102 are co-located within a common area at the worksite 114 and may perform similar operations or functions. For example, one or more of the digging machines move soil, sand, minerals, gravel, concrete, asphalt, overburden, and/or other material comprising at least part of a work surface 112 of the worksite 114. As such, under normal conditions, similar co-located digging machines 102 perform about the same with respect to productivity and efficiency when exposed to similar site conditions.

A compacting machine 104 refers to any machine that is configured to apply stress on a work surface 112 of the worksite 114 and cause densification of soil, concrete, asphalt, and/or other materials thereon, and/or to obtain an acceptable surface finish. In one example, the compacting process is performed with a compacting machine 104 such as a double drum compacting machines, having a front drum and a back drum, which serve to propel the machine and compact the material to a suitable state via the weight of the compacting machine 104, and is used in cooperation with drum vibrating apparatuses. Other examples of compacting machines 104 include a wheeled or tracked compactor, a vibratory compactor, and a tandem vibratory compactor among other types of compacting machines 104. In an example embodiment, the compacting machine 104 comprises a soil compacting machine 104 configured to compact soil or other materials located on the work surface 112 of the worksite. Although other materials are compacted using the compacting machine 104, the examples described herein are described in connection with soil compaction. Completing compaction includes multiple passes across the material with the compacting machine.

A hauling machine 106 refers to any machine that carries the excavated materials between different locations within worksite 114. Examples of hauling machines 106 include an articulated truck, an off-highway truck, an on-highway dump truck, and a wheel tractor scraper, among other types of hauling machines 106. Laden hauling machines 106 carry overburden from areas of excavation within worksite 114, along haul roads to various dump sites, and return to the same or different excavation areas to be loaded again. Under normal conditions, similar co-located hauling machines 106 perform about the same with respect to productivity and efficiency when exposed to similar site conditions.

A loading machine 108 refers to any machine that lifts, carries, loads, and/or removes material that has been reduced by one or more of the digging machines 102. In some examples, a loading machine 108 removes such material, and transports the removed material from a first location at the worksite 114 to a second location at the worksite 114 or off or onto the worksite. Examples of a loading machine 108 includes a wheeled or tracked loader, a front shovel, an excavator, a cable shovel, and a stack reclaimer, among other types of loading machines 108. One or more loading machines 108 can operate within common areas of worksite 114 to, for example, load reduced materials onto a hauling machine 106.

With continued reference to FIG. 1, the system 100 includes a control system 118 and a system controller 120 to receive and distribute information between various elements within the system 100. In some examples the control system 118 and/or the system controller 120 is located at a location remote from the worksite 114. In other examples, the system controller 120 and/or one or more components of the control system 118 is located at the worksite 114. Regardless of the location of the various components of the control system 118, such components are configured to receive information from the digging machines 102, loading machines 108, hauling machines 106, compacting machines 104, and/or other machines of the system 100.

With continued reference to FIG. 1, the system 100 also includes one or more controllers 134 associated with one or more of the digging machines 102, one or more of the compacting machines 104, one or more of the hauling machines 106, one or more of the loading machines 108, and/or other machines of the system 100, are operably connected to a power source of the machines 102, 104, 106, 108, and are configured to control various operations and/or features of the system 100. The controllers 134 may also be associated with a component of a separate mobile device such as, for example, a mobile phone, a tablet, and a laptop computer, among other types of mobile devices.

The system controller 120 and/or the controllers 134 may be an electronic controller that operates in a logical fashion to perform operations, execute control algorithms, store and retrieve data, and other desired operations. The system controller 120 and controllers 134 includes and/or access memory, secondary storage devices, processors, and any other components for running an application. The memory and secondary storage devices can be in the form of read-only memory (ROM) or random-access memory (RAM) or integrated circuitry that is accessible by the controller. Various other circuits are associated with the system controller 120 and controllers 134 such as power supply circuitry, signal conditioning circuitry, driver circuitry, and other types of circuitry.

The system controller 120 and/or a controller 134 is a single controller or includes more than one controller. As used herein, the term "controller" is meant in its broadest sense to include one or more controllers, processors, central processing units, and/or microprocessors that are associated with the system 100, and that may cooperate in controlling various functions and operations of the machines included in the system 100. The functionality of the system controller 120 and/or the controllers 134 are implemented in hardware and/or software without regard to the functionality. The system controller 120 and/or the controllers 134 may rely on one or more data maps, look-up tables, neural networks, algorithms, machine learning algorithms, and/or other components relating to the operating conditions and the operating environment of the system 100 that may be stored in the memory of the system controller 120 and/or the memory of controllers 134. Each of the data maps, look-up tables, neural networks, and/or other components noted above includes a collection of data in the form of tables, graphs, and/or equations to maximize the performance and efficiency of the system 100 and its operation.

The controllers 134 of the system 100 may also be in communication with and/or otherwise operably connected to any of the components of the system 100, including other respective controllers 134 of other machines 102, 104, 106, 108, or other machines, via a network 122. The network 122 comprises a local area network ("LAN"), a WiFi direct network, wireless LAN ("WLAN"), a larger network such as a wide area network ("WAN"), or a collection of networks, such as the Internet. Protocols for network communication, such as TCP/IP, are used to implement the network 122. Although embodiments are described herein as using a network 122 such as the Internet, other distribution techniques may be implemented that transmit information via memory cards, flash memory, or other portable memory devices.

It is also understood that the network 122 may comprise a component of a wireless communication system of the system 100, and as part of such a wireless communication system, the digging machines 102, loading machines 108, hauling machines 106, compacting machines 104, and/or other machines of the system 100 includes respective communication devices 124. Such communication devices 124 are operably connected to a controller 134 and communicatively connected to network 122. Communication devices 124 are configured to permit wireless transmission of a plurality of signals, instructions, and/or information between the a first controller 134, such as a controller of digging machine 102, and the respective controllers of the digging machines 102, loading machines 108, hauling machines 106, compacting machines 104, and/or other machines of the system 100. In some examples, communication devices 124 are configured to permit wireless transmission of a plurality of signals and/or information between controllers 134 and system controller 120. Such communication devices 124 may also be configured to permit communication with other machines and systems remote from the worksite 114. For example, such communication devices 124 includes a transmitter configured to transmit signals (e.g., via the central station 110 and over the network 122) to a receiver of one or more other such communication devices 124. In such examples, each communication device 124 may also include a receiver configured to receive such signals (e.g., via the central station 110 and over the network 122). In some examples, the transmitter and the receiver of a particular communication device 124 is combined as a transceiver or other such component. In any of the examples described herein, the respective controllers 134 of the digging machines 102, loading machines 108, hauling machines 106, compacting machine 104, and/or other machines of the system 100 are substantially similar to and/or the same as the system controller 120, and includes one or more of the same components thereof.

In any of the examples described herein, the communication devices 124 also enable communication (e.g., over the network 122) with one or more tablets, computers, cellular/wireless telephones, personal digital assistants, mobile devices, or other electronic devices 126 located at the worksite 114 and/or remote from the worksite 114. Such electronic devices 126 comprise, for example, mobile phones and/or tablets of project managers (e.g., foremen or supervisors) overseeing daily operations at the worksite 114. As used herein and in the appended claims, the term "line-of-sight (LOS)" is meant to be understood broadly as any location with respect to the worksite 114 that is not obstructed by a physical object such that electromagnetic waves may propagate between the location and the worksite 114.

Similarly, as used herein and in the appended claims, the term "remote" is meant to be understood broadly as being located away from the worksite 114. Although a remote location can be within LOS of the worksite 114, remote as used herein refers to a location at which a computing device such as the system controller 120, an electronic device 126, or another remotely-located computing device is not at or on the worksite 114 and uses intermediary communication devices such as the GPS satellites 130, the central station 110, and/or the network 122 to send signals to the worksite 114. Conversely, as used herein and in the appended claims, "local" is meant to be understood broadly as located at or on the worksite 114.

The network 122, communication devices 124, and/or other components of the wireless communication system described herein may implement or utilize any desired system or protocol including any of a plurality of communications standards. The desired protocols will permit communication between the system controller 120, controllers 134, the electronic devices 126, one or more of the communication devices 124, and/or any other desired machines or components of the system 100. Examples of wireless communications systems or protocols that are used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications are transmitted and received directly between a first machine (e.g., digging machines 102, loading machines 108, hauling machines 106, compacting machines 104, among other machines described herein) and a second machine (e.g., digging machines 102, loading machines 108, hauling machines 106, compacting machines 104, among other machines described herein) of the system 100.

In example embodiments, one or more machines of the system 100 (e.g., the digging machines 102, loading machines 108, hauling machines 106, compacting machines 104, among other machines described herein) includes a location sensor 128 configured to determine a location, speed, heading, and/or orientation of the respective machine. In such embodiments, the communication device 124 of the respective machine is configured to generate and/or transmit signals indicative of such determined locations, speeds, headings, orientations, haul distances, and/or area covered, to, for example, the system controller 120, controllers 134, and/or to the other respective machines of the system 100 as detected by the location sensor 128. In some examples, the location sensors 128 of the respective machines includes and/or comprise a component of global navigation satellite system (GNSS) or a global positioning system (GPS). Alternatively, universal total stations (UTS) is utilized to locate respective positions of the machines. In example embodiments, one or more of the location sensors 128 described herein comprise a GPS receiver, transmitter, transceiver, laser prisms, and/or other such device, and the location sensor 128 is in communication with one or more GPS satellites 130 and/or UTS to determine a respective location of the machine to which the location sensor 128 is connected continuously, substantially continuously, or at various time intervals. One or more additional machines of the system 100 may also be in communication with the one or more GPS satellites 130 and/or UTS, and such GPS satellites 130 and/or UTS may also be configured to determine respective locations of such additional machines. In any of the examples described herein, machine locations, speeds, headings, orientations, and/or other parameters determined by the respective location sensors 128 is used by the system controller 120 and/or other components of the system 100 to coordinate activities of the digging machines 102, loading machines 108, hauling machines 106, compacting machines 104, and/or other components of the system 100.

The GPS satellites 130 and/or UTS are used to transmit machine data from the digging machines 102, loading machines 108, hauling machines 106, compacting machines 104, and/or other machines of the system 100. Further, the GPS satellites 130 and/or UTS are used to transmit machine data to the system controller 120, controllers 134, or other data processing device or system within the system 100. The machine data is obtained by a number of sensors 132 coupled to the machines 102, 104, 106, 108, processed by the controller 134 of the respective machine 102, 104, 106,108, and transmitted to other computing devices such as the system controller 120, other respective controllers 134, the electronic devices 126, and/or other data processing devices within the system 100. Although one sensor 132 is depicted in association with each of the machines 102, 104, 106, 108, each machine includes a plurality of sensors 132 used to detect a plurality of different environmental parameters associated with the machines 102, 104, 106, 108. The sensors 132 may detect any environmental parameter such as, for example, light, motion, temperature, magnetic fields, electrical fields, gravity, velocity, acceleration in any number of directions, humidity, moisture, vibration, pressure, and sound, among other environmental parameters. Thus, the sensors 132 include accelerometers, thermometers, proximity sensors, electric filed proximity sensors, magnetometer, barometers, seismometer, pressure sensors, and acoustic sensors, among other types of sensors. Corresponding data associated with the type of sensor is gathered. Thus, data obtained via the sensors is transmitted to the controller 134 of the respective machine 102, 104, 106, 108 for further transmission and/or processing.

The machine data comprises machine telematics data that includes, for example, a location of the machines, utilization data that defines the manner, location, duration, and functions used by the machines, specifications of the machines, the health of the machines, the data obtained from the sensors 132, and other telematics data. Telematics, as used herein, means the complete measuring, transmitting, and receiving of data defining a value of a quantity at a distance, by electrical translating means such as a wired or wireless communication network including the network 122. In one example, the telematics data includes data associated with progress with regard to the level of completion of tasks and the worksite plan by the machines 102, 104, 106, 108 and can be presented as progress indicators sometimes referred to as key progress indicators (KPIs). The worksite plan includes a boundary of the worksite at which the worksite plan is implemented. Further, the worksite plan includes at least one task including mission parameters defining the worksite plan. The mission parameters includes instructions to the machines 102, 104, 106, 108 as to what actions are to be taken to fulfill the tasks such as, for example, a work area at which the task is to be performed, a number of interactive actions the machine is to take with regard to the material 116 such as number of loads to haul, number of passes to make, among other machine-specific mission parameters. The mission parameters may also include a time and/or date by which the task is to be completed or a scheduled time at which actions associated with the task can be performed. The worksite plan may also include at least one machine parameter that defines the dimensions and capabilities of the machines 102, 104, 106, 108. For example, the machine parameters includes sizes of work tool 136 or other material-moving implements of the machines 102, 104, 106, 108, an indication of the manual, autonomous, and remote control capabilities of the machine and whether these capabilities are available for the machines, the type of fuel consumed by the machines 102, 104, 106, 108, the physical dimensions of the machines 102, 104, 106, 108 and other machine parameters that are useful in determining what tasks of the worksite plan to assign to what machines 102, 104, 106, 108 and what type of operation mode to assign to the machines 102, 104, 106, 108. In some examples, data (e.g., machine, telematics, machine parameters, mission parameters, etc.) is shared directly between machines. For instance, a first controller 134 of a first machine 102 can receive data (e.g., data relating to characteristics of soil at the worksite 114) directly from a second controller 134 of a second machine 104, 106, 108, that can be useful in determining operating points for the first machine 102 at the worksite 114.

With reference again to the progress indicators (PIs), the PIs comprise any type of measurement used to evaluate a level or percentage of completion of a project such as the tasks executed by the machines 102, 104, 106, 108 that make up the worksite plan and the worksite plan as a whole. In one example, the telematics data may also include data obtained from the sensors 132. In this example, the telematics data includes data related to the detection of an obstacle within the worksite 114 or along a work surface 112 of the worksite 114. In one example, data related to the detection of an obstacle is obtained from a sensor 132 such as an imaging device, a light detection and ranging (LIDAR) device, a radar device, and a sonar device among other sensors and technologies used to detect objects in space. The controllers 134 of the respective machines 102, 104, 106, 108 are used along with the sensors 132 to execute obstacle detection software to identify and/or classify objects included on the image data obtained from the sensors 132. Still further, the telematics data includes data related to the worksite plan. In this example, the telematics data includes data sent from, for example, the system controller 120 of the control system 118, the electronic devices 126, and/or other data processing devices within the system 100. Still further, in one example, the telematics data may also include a unique identifier for each of the machines 102, 104, 106, 108 such as a license plate, a vehicle identification number (VIN), and a media access control (MAC) address associated with the controllers 134 and/or communication devices 124 of the respective machines 102, 104, 106, 108, among other types of unique identifiers. In one example, the unique identifier can be assigned to a machine 102, 104, 106,108 and stored in memory such as memory associated with the system controller 120 and/or the controller 134 of the respective machine 102, 104, 106,108.

As described herein, the machines 102, 104, 106, 108 may be operated semi-, or fully-autonomously. As used herein and in the appended claims, the term "autonomous" is meant to be understood broadly as any operation which is either completely automatic or substantially automatic, that is, without significant human involvement in the operation. An autonomous vehicle (e.g., the machines 102, 104, 106, 108) will generally be unmanned, that is without a human pilot or co-pilot. However, an autonomous vehicle is driven or otherwise operated automatically and have one or more human passengers. Similarly, as used herein and in the appended claims, the term "semi-autonomous" is meant to be understood broadly as any operation which is at least partially automatic and at least partially brought about by human involvement in the operation, that is, with at least some human involvement in the operation. A semi-autonomous vehicle (e.g., the machines 102, 104, 106, 108) is unmanned without a human pilot or co-pilot or is manned with a human pilot or co-pilot. In one example, the semi-autonomous vehicle is manned by at least one individual at the worksite such as within a first machine 102, 104, 106,108, or manned by an individual remotely operating the first machine via a second machine 102, 104, 106, 108.

Thus, as described herein, each of the machines 102, 104, 106,108 may report production metrics of various types. In one example, the system controller 120, controllers 134, the electronic devices 126, one or more of the communication devices 124, and/or any other desired machines or components of the system 100 may continuously or periodically send requests to the respective communication devices 124 of the machines 102, 104, 106,108 requesting data obtained from the sensors 132 and/or data associated with the progress indicators be transmitted to the machines or components of the system 100. In another example, the sensors 132 may sense the environment, and that data may be continuously or periodically transmitted to the system controller 120, controllers 134, the electronic devices 126, one or more of the communication devices 124, and/or any other desired machines or components of the system 100 via the communication devices 124 and/or the controllers 134.

Thus, as described above, each of the machines 102, 104, 106, 108 may report production metrics in the form of progress indicators (PIs) of different types. Truck loads delivered by the machines 102, 104, 106,108 and/or a final grade (e.g., via grade control, manual survey, or drone flight) of the worksite 114 is measured to determine progress of the individual tasks within the worksite plan and the entire worksite plan such as a mass excavation project that utilizes a plurality of different machines 102, 104, 106, 108. The PIs are used to identify underperforming machines 102, 104, 106, 108 within the worksite plan as well as to allow supervisors, foremen, managers, crew members, and other individuals associated with the worksite plan to know how far along the worksite plan has progressed, how much of the worksite plan is left to complete, and/or whether an updated worksite map is available. The PIs are presented on a user interface on, for example, the display devices of the electronic devices 126, a display device associated with the controller 134, and/or another display device associated the within the system 100. With the display of these production metrics, a user, such as the supervisors, managers, crew members or other individuals associated with the worksite plan, may understand each individual production metric as defined by the PIs as it relates to the tasks and the overall worksite plan. The data sensed by the sensors 132 and transmitted from the machines 102, 104, 106, 108 are processed by, for example, the system controller 120 using on one or more data maps, look-up tables, neural networks, algorithms, machine learning algorithms, and/or other components to present the data as PIs to the users. In one example, the individual machines 102, 104, 106, 108 may execute their respective tasks within the worksite plan independently. In another example, the machines 102, 104, 106, 108 may operate together to execute and complete the tasks and the worksite plan. In these examples, the PIs are sent as individual sets of data from individual machines 102, 104, 106,108, the PIs are grouped together as groups of machines 102, 104, 106, 108 collect data from their respective sensors, or the PIs (as collect data from respective sensors 132) are grouped together based on the machines 102, 104, 106, 108 being similar or identical machines 102, 104, 106, 108.

With continued reference to FIG. 1, and as noted above, each of the machines 102, 104, 106,108, and/or other machines of the system 100 includes a controller 134 as described herein. The controller 134 may comprise a component of a local control system on-board and/or otherwise carried by the respective machine 102, 104, 106,108. The controllers 134 may be any embedded system within the machines 102, 104, 106, 108 that controls at least one of the electrical systems or subsystems in the machines 102, 104, 106, 108, and thus at least one operation of the machines 102, 104, 106, 108. Such controllers 134 are generally similar or identical to the system controller 120 of the control system 118. For example, each such controller 134 comprises one or more processors, a memory, and/or other components described herein with respect to the system controller 120. The controllers 134 includes a remote-control module (RCM) 142 to enable a first controller 134 of a first machine 102, 104, 106, 108, to remotely control a second machine 102, 104, 106, 108, at worksite 114. In some examples, the RCM 142 includes memory storing mappings of controls of a first machine 102, 104, 106, 108 to one or more other machines 102, 104, 106, 108. For example, a first controller 134 of a dozer 102, includes a RCM 142 that maps the controls (e.g., power, pedal(s), joystick, switch(es), etc.) of the dozer to a second machine, such as a compactor 104. In this example, an operator of the dozer 102 can remotely control the compactor 104, using the controls of the dozer 102, via communication between respective controllers 134.

The controllers 134 may also include an ECU such as, for example, an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), and a control unit, among other types of ECUs. The ECUs includes hardware and embedded software that assist in the operation of the machines 102, 104, 106,108.

In some examples, a controller 134 is located on a respective one of the machines 102, 104, 106,108, and may also include components located remotely from the respective one of the machines 102, 104, 106, 108, such as on any of the other machines of the system 100. Thus, in some examples the functionality of the controller 134 is distributed so that certain functions are performed on the respective one of the machines 102, 104, 106,108. In some examples, controller 134 of the local control system carried by a respective machine 102, 104, 106,108 enables autonomous and/or semi-autonomous control of the respective machine or another respective machine 102, 104, 106, 108 by the RCM 142. Further, a first controller 134 carried by a first respective machine 102, 104, 106, 108 can instruct the respective communication devices 124 and location sensors 128 to operate as described herein and as directed by, for example, a second controller 134 carried by a second respective machine 102, 104, 106, 108.

In some examples one or more machines 102, 104, 106, 108 of the system 100 includes an implement or other work tool 136 that is coupled to a frame of the machine and configured to perform a task at the work site. For example, in the case of a loading machine 108, the work tool comprises a bucket configured to carry material within an open volume or other substantially open space thereof. The loading machine 108 is configured to, for example, scoop, lift, and/or otherwise load material (e.g., material removed by the digging machines 102) into the work tool 136 by lowering the work tool 136 to a loading position. For example, the loading machine 108 includes one or more linkages 138 movably connected to a frame of the loading machine. The work tool 136 is connected to such linkages 138, and the linkages 138 is used to lower the work tool 136 (e.g., via one or more hydraulic cylinders, electronic motors, or other devices connected thereto) to a loading position in which a leading edge 142 of the work tool 136 is disposed proximate, adjacent, and/or at the work surface 112, and a base of the work tool 136 is disposed substantially parallel to the work surface 112. The loading machine 108 may then be controlled to advance along the surface of the work surface 112 of the worksite 114 such that the work tool 136 may impact the material, a positive-volume soil 116, and/or other object disposed on the work surface 112 so as to transfer the material at least partially into the open space of the work tool 136. The linkages 138 be controlled to raise, pivot, and/or tilt the work tool 136 to a carrying position above the work surface 112. The loading machine 108 is controlled to traverse the worksite 114 until the loading machine 108 reaches a dump zone, the hauling machine 106, and/or another location at the worksite 114 designated for receiving the removed material being carried by the work tool 136. The linkages 138 are controlled to lower, pivot, and/or tilt the work tool 136 to an unloading position in which the material carried within the open space of the work tool 136 is deposited (e.g., due to the force of gravity acting on the material carried by the work tool 136) at the dump zone, within a bed of the hauling machine 106, and/or as otherwise desired. Like the loading machines 108, the digging machines 102, hauling machines 106, compacting machines 104, may also include work tools 136 and/or linkages 138 that allow the machines to perform their respective operations as described herein.

Thus, the systems and methods described herein provide on-machine remote control to an operator of a machine at a work site 114 for control of one or more other machine(s). Such systems and methods are used to more effectively operate machines, such as one or more of the machines 102, 104, 106, 108 described above, at a worksite having little or no cell tower coverage and/or wireless connectivity. Accordingly, the systems described herein can be implemented without using known NLOS systems and corresponding resources.

Figures 2, 3:
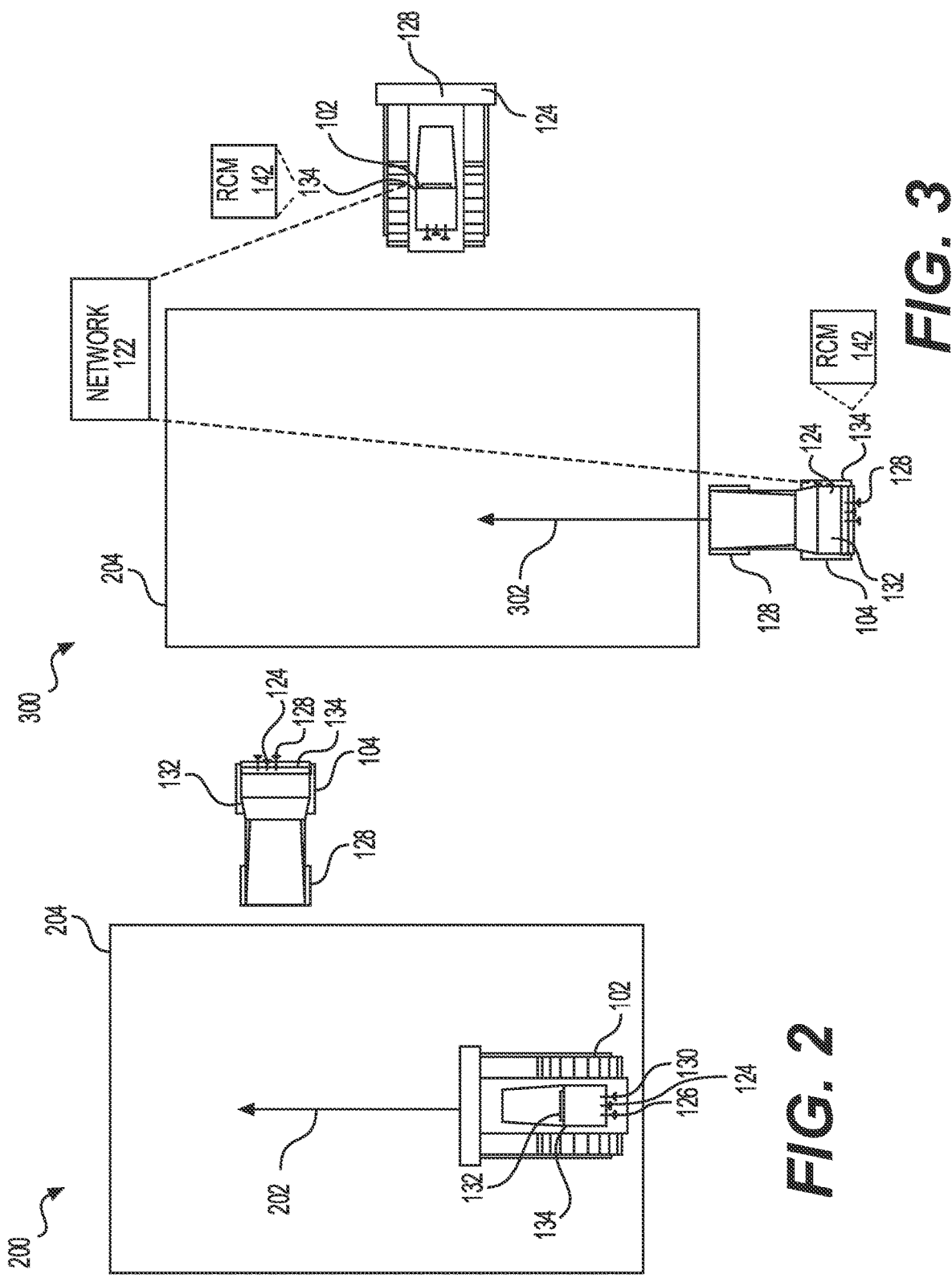
FIG. 2 is a schematic illustration of the example system shown in FIG. 1.
FIG. 3 is another schematic illustration of the example system shown in FIG. 1.

FIGS. 2 and 3 illustrate aspects of the example system 100 and worksite 114 described above with respect to FIG. 1 in further detail. As noted above, and as shown in FIG. 2, a digging machine 102, such as a dozer, can be manually operated by an operator to travel along, and/or otherwise traverse path 202 in order to perform various tasks with respect to the work surface 112 for a portion 204 of the worksite 114. As illustrated in FIG. 2, the worksite 114 can include one or more other machine(s), such as compacting machine 104. As noted above, digging machine 102 and/or compacting machine 104 can include communication devices 124, location sensors 128, sensors 132, controllers 134, RCMs 142, among other components. The digging machine 102 and the compacting machine 104 are communicatively connected via network 122.

As noted above, and as shown in FIG. 3, after the digging machine 102 has completed performing the various tasks (e.g., digging operation(s)) with respect to the work surface 112 of the portion 204 of the worksite 114, a compacting machine 104 are controlled to travel along, and/or otherwise traverse path 302 in order to perform various tasks at the portion 204 of the worksite 114.

As noted above, the compacting machine may be remotely controlled by the operator of the digging machine 102. For example, once the operator of the digging machine 102 has completed performing the task(s) at the portion 204 of the worksite 114, the operator can use communication device 124 to access the RCM 142 of controller 134 of the digging machine 102 in order to remotely control another machine. The operator can indicate, via the display of the communication device 124, that they want to switch modes in order to remotely control another machine on the worksite 114. In this example, the controller 134 of the digging machine 102 identifies compacting machine 104 as being available for control (e.g., connected to network 122). The operator of the digging machine 102 may select, via the user interface of the communication device 124, the compacting machine 104 for control. In this example, the controller 134 of the digging machine 102 causes a user interface associated with the compacting machine 104 to be displayed on the communication device 124 of the digging machine 102. The controller 134 can then receive input(s) from the operator (e.g., via the user interface and/or via other input devices of the machine) that correspond to various controls of the compacting machine 104, where the various controls are operably connected to the controller 134 of the digging machine 102 and configured to direct input to the controller 134. For instance, the controller 134 can receive manual and/or physical input(s) (e.g., via input devices, such as manual adjustment of a joystick, pressing a pedal, moving a switch, moving a steering wheel, etc.) from the operator of the digging machine 102 or a selection of a control displayed on the user interface of the communication device 124 (e.g., power on, honk horn, flash lights, etc.) of the digging machine 102. Based on the input(s), the controller 134 (and/or the controller 134 accessing the RCM 142) can identify a corresponding control of the compacting machine 104 that corresponds to the input received from the operator of the digging machine 102. The controller 134 generates instructions and transmit the instructions, via the network 122, to a second controller 134 and/or second RCM 142 of the second controller 134 of the compacting machine 104. The second controller 134 of the compacting machine 104 executes the instructions and instructs the ECM of the compacting machine 104 to perform a task corresponding to the instructions.

For example, the controller 134 of the digging machine 102 may transmit instructions for the compacting machine 104 to activate its horn. In this example, the controller 134 sends the instructions, via the network 122, to the second controller 134 of the compacting machine 104. The second controller 134 of the compacting machine, in response to receiving the instructions and based on executing the instructions, activates a relay to an operator switch on the compacting machine 104 to cause the compacting machine 104 to activate its horn. In some examples, as shown in FIG. 3, the second controller 134 of the compacting machine 104 receives instructions to travel along path 302 of the portion 204 of the worksite 114. In response to receiving the instructions, the second controller 134 executes the instructions and activates a relay to another controller of an ECM on a component of the compacting machine 104 to cause the compacting machine 104 to perform an action (e.g., travel along the path 302). In some examples, the second controller 134 of the compacting machine 104 corresponds to a base machine controller associated with the action, such that the second controller 134 does not activate a relay. For instance, the controller 134 of the digging machine 102 generates and sends second instructions to the second controller 134 of the compacting machine 104, where the second instructions include an indication to cause the compacting machine 104 to turn left. In this example, the second controller 134 corresponds to a base machine controller of the compacting machine 104 that causes the compacting machine 104 to perform steering actions in response to input (e.g., such as physical input/manual adjustment from an operator of the compacting machine 104 and/or remote input from the controller 134 of the digging machine 102). In this example, the second controller 134 of the compacting machine 104 receives the second instructions as input and, in response, causes the compacting machine 104 to perform the action (e.g., turn left). In some examples, the compacting machine 104 may operate autonomously, such that digging machine 102 can perform other tasks at a different portion (not shown) of worksite 114, at the same time compacting machine 104 is operating. In some examples, the controller 134 of digging machine 102 receives feedback (e.g., data from sensors 132, location sensor 128, KPI's, PI's, etc.) from the second controller 134 of the compacting machine 104 related to the task(s) being performed by the compacting machine 104. In this example, the controller 134 may cause at least a portion of the feedback to be displayed and/or presented to the operator of the digging machine 102 via one or more user interfaces of the digging machine 102, such as via display(s) the communication device 124.

Accordingly, through the use of controllers 134 and RCMs 142, the systems and methods described herein enable an operator of the digging machine 102 to remotely control the compacting machine 104 using control(s) of the digging machine 102, thereby reducing the computational resources, control infrastructure, and cost required to perform various operations at the worksite 114 and improving the efficiency of the system 100.

Figure 4:
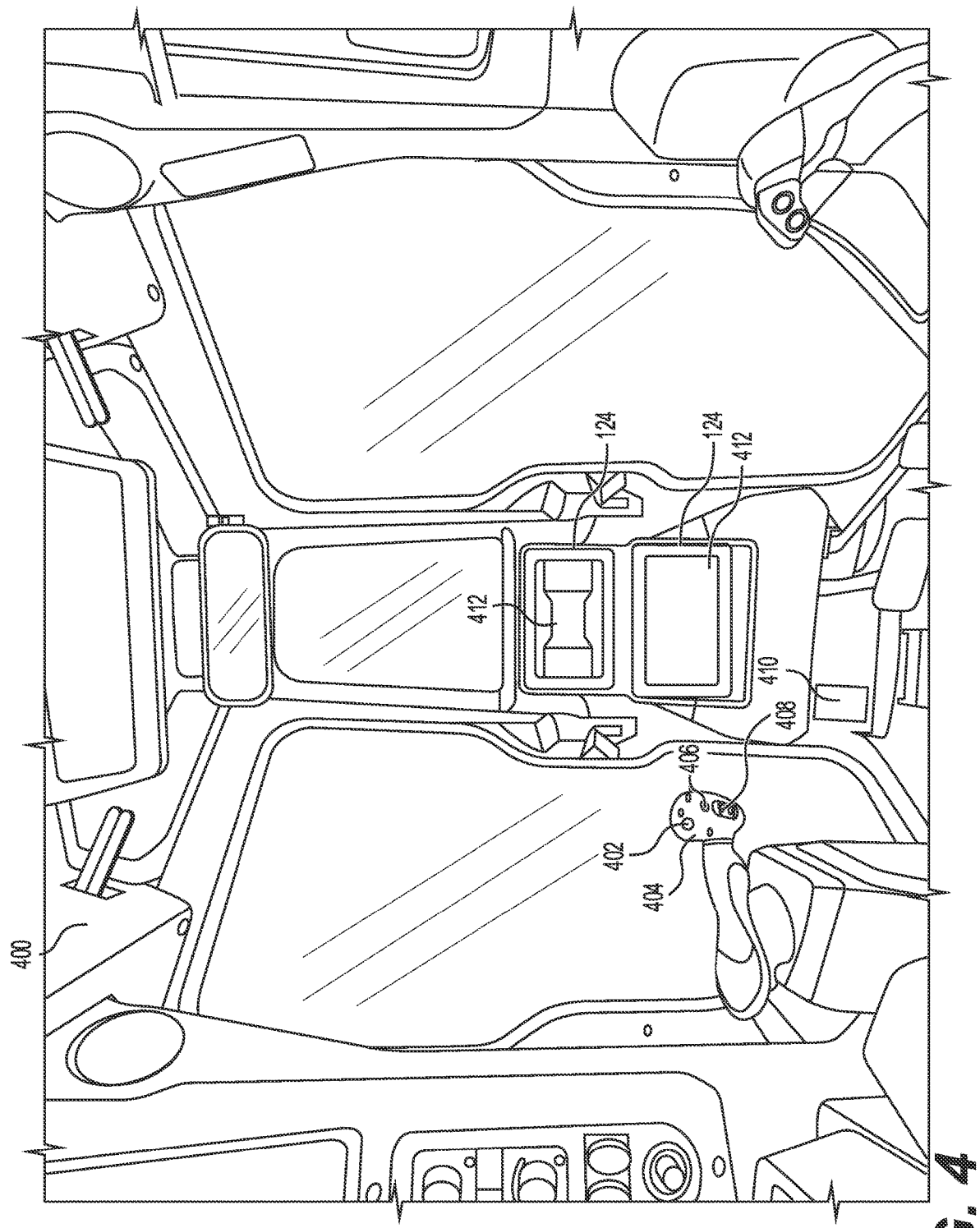
FIG. 4 is an illustration of an example operator compartment of a machine.

FIG. 4 illustrates aspects of the example system 100 and worksite 114 described above with respect to FIG. 1 in further detail. As noted above, and as shown in FIG. 4, a machine 400 (e.g., a digging machine 102, a compacting machine 104, a hauling machine 106, a loading machine 108, among other machines located at the worksite 114) are manually operated and/or operated in order to remotely control another machine 102, 104, 106, 108 (not shown) at the worksite 114.

As illustrated in FIG. 4, the machine 400 includes a cab or other such operator compartment, and such an operator compartment includes one or more input devices 402, 404, 406, 408, 410 configured for use, by an operator of the machine 400, to control respective operations of the machine 400. The input devices 402, 404, 408, 410 illustrated are an example and should not be construed as limiting. In some examples machine 400 includes more controls than what is illustrated in FIG. 4. In other examples, machine 400 includes fewer controls than what is illustrated in FIG. 4.

In some examples, machine 400 may represent a digging machine 102 and input devices 402, 404, 406, 408, 410, may represent respective controls that an operator of the digging machine 102 uses during manual operation. For instance, a first input device 402 may represent a park brake switch. The park brake switch 402, when switched to "on," may indicate to the controller 134 to instruct the machine 400 to remain parked and not move. The park brake switch 402, when switched to "off" may indicate to the controller 134 to instruct the machine 400 to move in combination with another control (e.g., 404, 406, 408, 410, etc.). A second input device 404 represents a lever that the operator can push and/or pull in order to steer the machine 400. A third input device 406 represents a gear shift switch that the operator can use to change gears during the operation of the machine 400. A fourth input device 408 represents a forward, neutral, reverse ("FNR") switch that the operator can use to instruct the machine 400 regarding a direction to move or not move. A fifth input device 410 represents a foot pad that the operator can use to accelerate and/or decelerate during operation of the machine 400.

As noted above and illustrated in FIG. 4, the machine 400 may also include a communication device 124. The communication device 124 includes one or more displays 412. In some examples, the communication device 124 is operably connected to controller 134. The controller 134 may cause the displays 412 to present one or more user interfaces to an operator of the machine 400. In some examples, such as when the operator is manually operating the machine 400, controller 134 receives feedback from the machine 400 and causes the communication device 124 to display a user interface that includes the feedback. For instance, the controller 134 may receive feedback from sensors 132, location sensor 128, communication device 124, and/or one or more cameras (not shown). The feedback includes diagnostic information (e.g., machine data, telematics data, sensor data, etc.) associated with the machine 400 and/or any information the operator of the machine 400 needs during machine operation. In other examples, such as when the machine 400 is remotely controlling a second machine (not shown), the controller 134 may cause the display of a user interface associated with the second machine, such as via a display of communication device 124. In this example, the controller 134 receives feedback from a device (e.g., sensors 132, location sensor 128, communication device 124, one or more cameras, etc.) of the second machine. The controller 134 causes a user interface to be presented and/or displayed that includes at least a portion of the feedback received from the second machine.

In some examples, such as when the machine 400 is remotely operating a second machine (not shown), the operator may use input devices 402, 404, 406, 408, 410 of the machine 400 to control the second machine. For instance, the machine 400 may represent a digging machine 102 and the operator performs an action with respect to the input devices 402, 404, 406, 408, 410, of the machine 400. In some examples, the operator may physically switch the fourth input device 408 of the machine 400 to the "forward" position. The controller 134 of the machine 400 receives the action as an input. The controller 134 maps the input to a corresponding control of the second machine. For instance, where the second machine is a compacting machine 104, the controller 134 may identify that the input from the fourth input device 408 corresponds to an FNR switch control on the second machine. The controller 134 generates and sends instructions, via the network 122, to a second controller 134 on the second machine, where the second instructions are configured to cause the second controller 134 of the second machine to perform a desired operation (e.g., switch the FNR switch control of the second machine to the "forward" position). In response to receiving the instructions, the second controller 134 causes the second machine to perform the direction operation. For instance, in response to receiving the instructions, the second controller 134 of the second machine may activate a relay from the second controller 134 and to an operator switch on the second machine in order to electronically switch the FNR switch on the second machine to the "forward" position.

Accordingly, by mapping of control(s) of the machine 400 to corresponding control(s) of a second machine and providing feedback to an operator of the machine 400, the systems and methods described herein enable an operator of the machine 400 to remotely control the second machine using control(s) (e.g., such as input device(s) 402, 404, 406, 408, 410) of the machine 400, thereby reducing the computational resources, control infrastructure, and cost required to perform various operations at the worksite 114 and improving the efficiency of the system 100.

FIGS. 5-7 illustrate an example user interfaces 500, 600, and 700 that are displayed on a first machine 102, 104, 106, 108. In some examples, user interfaces 500, 600, and 700 are displayed via a display of a communication device 124 of the first machine. The elements illustrated in user interfaces 500, 600, and 700 are examples and should not be construed as limiting. In some examples, user interfaces 500, 600, and 700 include more or fewer elements than what is illustrated in FIGS. 5-7.

As illustrated in FIG. 5, user interface 500 includes an element 502 that indicates a first machine (e.g., such as a digging machine 102) is being operated by an operator. User interface 500 may also include various selectable elements 504, 506, 510, 512, 514, 516, that are selectable by the operator of the first machine 102 and provide input to a controller 134 of the first machine 102. In some examples, the controller 134 of the first machine 102 can cause the communication device 124 of the first machine 102 to display user interface 500 while the operator is manually operating the first machine 102 and performing various tasks at worksite 114.

A first selectable element 504, corresponds to power of the first machine 102. For instance, the operator may select the first selectable element 504 in order to start a machine engine and/or a power source of the first machine 102. A second selectable element 506, corresponds to one or more controls that are selectable by the operator to cause the first machine 102 to perform a desired operation or task (e.g., honk a horn, turn lights on or off, access machine settings, etc.). A third selectable element 510, corresponds to one or more modes (e.g., manual, semi-autonomous, autonomous) related to the first machine 102. For instance, when the operator is manually operating the first machine 102, the operator may select a "manual" mode associated with the third selectable element 510. The third selectable element 510 indicates the first machine 102 is operating in "manual" mode during operation.

User interface 500 includes a fourth selectable element 512. The fourth selectable element 512 corresponds to a control that the operator may select in order to cause the controller 134 of the first machine 102 to switch the first machine 102 from a first operating mode to a second operating mode. For instance, the first operating mode corresponds to manual operation of the first machine 102 and the second operating mode corresponds to the first machine 102 remotely controlling a second machine 102, 104, 106, 108 at the worksite 114 (e.g., via the controller 134 and/or RCM 142 of the first machine 102).

User interface 500 includes a fifth selectable element 514, which corresponds to a control that the operator can select to display a view from one or more cameras located on the first machine 102. In some examples, a portion of user interface 500 may display a view from one or more cameras on the first machine 102 without the operator having to select a control. A sixth selectable element 516, may correspond to a control that the operator of the first machine 102 can select in order to show mappings of physical controls (e.g., such as input devices) to various operations on the first machine 102. As noted above with regard to FIG. 4, a first machine, such as digging machine 102, may have one or more input devices 402, 404, 406, 408, 410, that the operator of the first machine 102 can physically manipulate to perform various operations. In some examples, mappings of how to manipulate the input devices 402, 404, 406, 408, 410 in order to perform corresponding operations associated with the first machine 102 are displayed on user interface 500 when input indicating selectable element 516 is selected is received by the controller 134 of the first machine 102.

User interface 500 includes element 508, which includes information the controller 134 of the first machine 102 causes to be displayed and/or presented via a display of the first machine 102. In some examples, user interface 500 is displayed via a display of communication device 124 of the first machine 102. In some examples and as noted above, the controller 134 of the first machine 102, receives feedback from one or more sensors 132, camera(s), and/or a location sensor 128 of the first machine 102. The controller 134 of the first machine 102 may cause the communication device 124 to display at least a portion of the feedback as information to the operator of the first machine 102, via element 508. In some examples and as noted above, the feedback may relate to diagnostic information and/or data associated with one or more components the first machine 102, progress indicators, machine temperature(s), machine speed, engine speed, among other things.

As illustrated in FIG. 6, user interface 600 is displayed by the controller 134 of the first machine 102 in response to the controller 134 of the first machine 102 receives input indicating the operator of the first machine has selected the fourth selectable element 512 on user interface 500 to enable the operator to remotely control a second machine 102, 104, 106, 108. For instance, when the first machine (e.g., such as digging machine 102) is operating in a first operating mode (e.g., being manually operated), the controller 134 of the first machine 102 may cause user interface 500 to be displayed via a communication device 124 of the first machine 102. As noted above, the controller 134 of the first machine 102 receives input indicating the operator has selected the fourth selectable element 512 on user interface 500. The controller 134 of the first machine 102 causes, in response to the input, the communication device 124 of the first machine to display user interface 600 on the first machine 102. In some examples, the controller 134 of the first machine identifies, in response to the input, one or more additional machines 102, 104, 106, 108 at the worksite 114 that are connected to network 122 and available for remote control by the first machine 102.

As illustrated in FIG. 6, user interface 600 includes a first instruction 602 requesting the operator select one or more second machines 604 that have been identified by the controller 134 of the first machine as being available for remote control. In some examples, user interface 600 includes a second instruction 606 requesting input indicating a selection of an area 608 of the worksite 114. The area 608 of the worksite 114 may correspond to a portion of the worksite 114 that the first machine has previously completed performing work on. For instance, as noted above, the first machine 102 (e.g., digging machine 102) performs various operations (e.g., clearing soil, etc.) with regard to a work surface 112 at a portion 608 of worksite 114. Once the operations are completed, the controller 134 of the first machine 102 may receive input indicating a selection of one or more additional machines 604 to perform various additional operations (e.g., compacting, grading, excavating, etc.) on the same portion 608 of the worksite 114. In some examples, the additional operations are performed by the operator remotely controlling the one or more second machines 604 using the controller 134 of the first machine 102. In some examples, the one or more additional machines 604 are instructed to perform the various additional operations with respect to the portion 608 of the worksite 114 autonomously.

As illustrated in FIG. 7 and noted above, user interface 700 is displayed via a display of a communication device 124 of the first machine 102, 104, 106, 108. In some examples, user interface 700 is displayed when a controller 134 of the first machine 102, 104, 106, 108 is operating in a second operating mode (e.g., remotely controlling a second machine). For instance, as noted above, a controller 134 of a first machine (e.g., a digging machine 102) receives input via user interface 600, provided by the display of the first machine, indicating a selection of a second machine, such as compacting machine 104, from the one or more additional machines 604 displayed. In response to the input, the first controller 134 of such a first machine connects, via network 122, to a second controller 134 of the second machine, and causes the second controller 134 to begin operating the the second machine in a second operating mode (e.g., an operating mode in which the second machine is remotely controlled by the first controller 134 of the first machine). The controller 134 of the first machine, while operating in the second operating mode, may generate and cause user interface 700 to be displayed and/or presented via a display of the digging machine 102.

As noted above and illustrated in FIG. 7, user interface 700 includes an element 702 that identifies and/or otherwise indicates that the second machine (e.g., a "controlled" machine) is being remotely operated and/or otherwise controlled by a controller 134 of a first machine (e.g., a "controlling" machine, such as digging machine 102). User interface 700 may also include various selectable elements 704, 706, 710, 712, 714, 716, that are selectable and provide input to the controller 134 of the first machine 102 to indicate desired operations associated with the second machine. A first selectable element 504, may correspond to power of the first machine 102. For instance, the operator may select the first selectable element 704 in order to turn on or otherwise activate the engine or other power source (e.g., battery packs, fuel cells, etc.) of the second machine. In this example, the controller 134 of the first machine 102 receives the selection as input and, in response, generates and sends instructions to a second controller 134 on the second machine instructing the second controller 134 to turn on the engine of the second machine. A second selectable element 706, may correspond to one or more controls that are selectable by the operator to cause the controller 134 of the first machine to generate and send instructions to cause a second controller 134 of the second machine to perform a desired operation or task (e.g., honk a horn, turn lights on or off, access machine settings, etc.). A third selectable element 710, may correspond to one or more modes (e.g., manual, semi-autonomous, autonomous) related to the first machine 102. For instance, when a controller 134 of a digging machine 102 (e.g., the first machine) is operating in a second operating mode (e.g., remotely controlling the second machine, such as a compacting machine 104), the operator may select a "semi-autonomous" mode associated with the third selectable element 710. The controller 134 of the first machine may cause the third selectable element 710 to indicate the compacting machine 104 is operating in "semi-autonomous" mode during operation.

User interface 700 includes a fourth selectable element 712. The fourth selectable element 712 corresponds to a control that the operator may select in order to cause the controller 134 to switch the first machine 102 from the second operating mode to the first operating mode. For instance, when controller 134 of the first machine is operating in the second operating mode (e.g., remotely controlling a second machine), the controller 134 of the first machine may receive input indicating a selection of the fourth selectable element 712 and, in response to the input, terminate the remote connection with the second controller 134 of the second machine, begin operating in the first operating mode, and generate and cause user interface 500 to be displayed on the first machine 102.

User interface 700 includes a fifth selectable element 714, which may correspond to a control that is selectable to display a view from one or more cameras located on the second machine. For instance, an operator of the first machine can select the fifth selectable element 714, which causes the controller 134 of the first machine to display additional icons indicating camera(s) on the second machine the operator can view. The controller 134 of the first machine may receive a second input from the operator, the second input indicating a selection of a particular camera, and, in response, the controller 134 of the first machine causes element 718 to display a live view from the selected camera. In some examples, a portion of user interface 700 (e.g., element 718) may display a view from one or more cameras on the second machine whenever the controller is operating in the second operating mode.

User interface 700 includes a sixth selectable element 716, which corresponds to a control that may cause the controller 134 of the first machine to display mappings of physical and/or manual controls (e.g., input devices) of the first machine 102 to various desired operations on the second machine. As noted above with regard to FIG. 4, the first machine, such as digging machine 102, has one or more input devices 402, 404, 406, 408, 410, that the operator of the digging machine 102 can manipulate to perform various operations. In some examples, mappings of how to manually and/or physically manipulate the input devices 402, 404, 406, 408, 410 of the digging machine 102 in order to perform corresponding desired operations on the second machine (e.g., such as a compacting machine 104) are displayed on user interface 700 in response to the controller 134 of the digging machine 102 receiving input indicating selectable element 716.

User interface 700 includes element 708, which includes information the controller 134 of the first machine causes to be displayed and/or presented via a display of the first machine 102. In some examples and as noted above, the controller 134 of the first machine 102 receives feedback from a second controller 134 of the second machine, one or more sensors 132, camera(s), and/or a location sensor 128 of the second machine. In some examples, the controller 134 of the first machine causes at least a portion of the feedback as information to be presented on a display of the first machine 102, via element 708. In some examples and as noted above, the feedback relates to diagnostic information and/or data associated with one or more components the second machine, progress indicators, machine temperature(s), machine speed, engine speed, among other things.

In some examples, the elements included on user interface 700 are selected by the controller 134 of the first machine and based on the input indicating the selection of the second machine. For example, the elements the controller 134 of the first machine generates and includes on user interface 700 when a compacting machine 104 is selected are different from elements the controller 134 of the first machine generates and includes on user interface 700 when a hauling machine 106 is selected.

Accordingly, by mapping of control(s) of the first machine 102 to corresponding control(s) of a second machine 104 and providing feedback to an operator of the machine 102, user interfaces 500, 600, and 700 enable an operator of the first machine 102 to remotely control the second machine 104 using control(s) (e.g., input device(s) and control(s) on the user interfaces 500, 600, and/or 700) of the first machine 102, thereby reducing the computational resources, control infrastructure, and cost required to perform various operations at the worksite 114 and improving the efficiency of the system 100.

Figure 8:
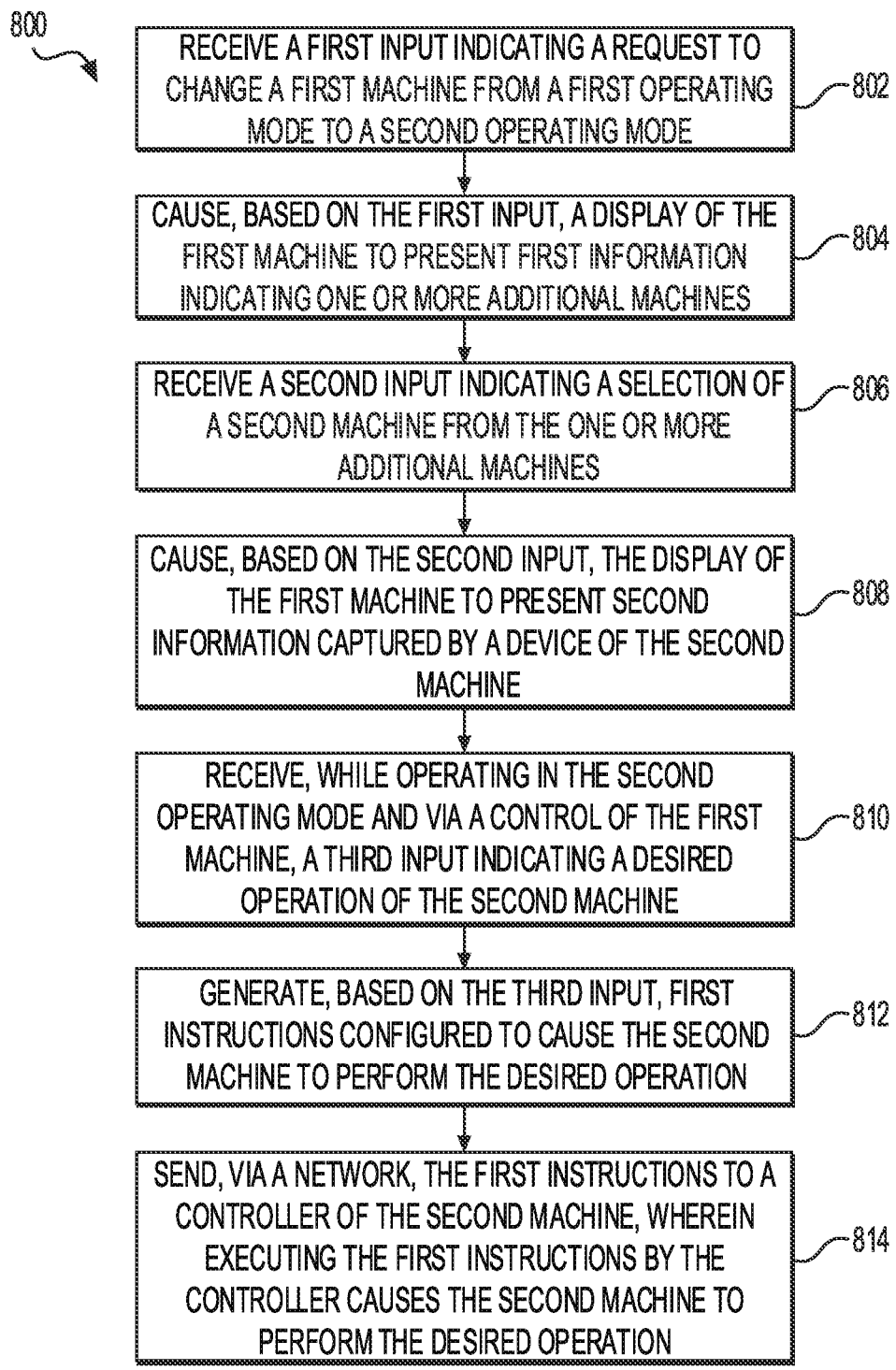
FIG. 8 is a flow chart depicting an example method associated with the system shown in FIG. 1.

FIG. 8 is a flow chart depicting an example method 800 associated with the system shown in FIG. 1. The process is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

As shown in FIG. 8, at 802 a first controller 134 of a first machine (e.g., the machine 102) receives a first input indicating a request to change operation of the first machine 102 from a first operating mode (e.g., a current operating mode) to a second operating mode. The first controller 134 is operable to control the first machine 102 in a first operating mode. The first controller 134 is also operable in a second operating mode to remotely control a second machine disposed at worksite 114. As described herein, when operating in the first operating mode, the first controller 134 of the first machine 102 is programmed and/or otherwise configured to facilitate manual operation of the first machine 102. When operating in the second operating mode, the first controller 134 of the first machine 102 is programmed and/or otherwise configured to remotely control a second machine 104. In some examples, the first machine is a dozer 102 and the second machine is a compactor 104.

At 804, the first controller 134 causes, based on the first input, a display of the first machine 102 to present first information indicating one or more additional machines that are disposed at the worksite 114. In some examples, the first controller 134 identifies, prior to presenting the first information, the one or more additional machines based on determining the one or more additional machines are connected to network 122 and enabled to be remotely controlled. In some examples, the first controller 134 causes the one or more additional machines to be presented on a user interface, such as user interface 500. In some examples, the display comprises a first user interface associated with the first operating mode (e.g., user interface 500) and a second user interface associated with the second operating mode (e.g., user interface 700).

At 806, the first controller 134 receives a second input indicating a selection of a second machine 104 from the one or more additional machines. As described herein, the second input can also indicate a selection of an area of the worksite 114 the second machine 104 is intended to work on. In some examples, the second input is received by the first controller 134 via a selection on user interface, such as user interface 600.

At 808, the first controller 134 causes, based on the second input, the display of the first machine 102 to present second information captured by a device of the second machine 104. In some examples, the device of the second machine 104 corresponds to a camera, sensors 132, a location sensor 128, among other components of the second machine 104. For instance, the first controller 134 can cause the second information to be presented by generating a user interface corresponding to the second machine 104, such as user interface 700 described above. In some examples, the first controller 134 causes a portion of the second information to be presented on the display of the first machine 102.

At 810, the first controller 134 receives, while operating in the second operating mode and via a control of the first machine 102, a third input indicating a desired operation of the second machine 104. The control of the first machine 102 is configured to control an operation of the first machine while the first controller is operating in the first operating mode. In some examples, the third input is received through a manual adjustment and/or physical manipulation of the control, where the control comprises an input device, such as at least one of a lever, a steering wheel, a joystick, a pedal, or a switch of the first machine 102.

At 812, the first controller 134 generates, based on the third input, first instructions configured to cause the second machine 104 to perform the desired operation. In some examples, the first controller 134 generates the first instructions based on mapping the control of the first machine 102 to a second, corresponding control of the second machine 104 configured to control a corresponding operation of the second machine 104 corresponding to the desired operation.

At 814, the first controller 134 sends, via a network, the first instructions to a second controller 134 of the second machine, the second controller causing the second machine 104 to perform the desired operation based on the first instruction. As noted above, in some examples, the second controller 134 may activate, based on the first instructions, a relay from the second controller 134 to a corresponding control (e.g., operator switch, etc.) of the desired operation. In other examples, as noted above, the second controller 134 corresponds to a base machine controller of the second machine that is associated with the desired operation. In this example, the second controller 134 receives the first instructions as input and, in response, causes the second machine to perform the desired operation.

In some examples, the first controller 134 of the first machine receives, from the second controller 134 and via the network 122, information from the device of the second machine 104 that is associated with the second machine 104 performing the desired operation associated with the control. The first controller 134 of the first machine 102 causes the display of the first machine 102 to present at least a portion of the information, as described above.

In some examples, the first controller 134 of the first machine 102 receives fourth input, such as via the display of the first machine 102. In some examples, the fourth input indicates a second request to change the first machine 102 from the second operating mode to the first operating mode, such that first controller 134 is operable to locally control the first machine 102. In this example, the first controller 134 generates a user interface, such as user interface 500, and cause, based on the fourth input, the display of the first machine to present information captured by device(s) (e.g., sensors, cameras, location sensor, etc.) of the first machine. The first controller 134, while operating in the first operating mode, can receive a fifth input. The fifth input can indicate a desired operation with respect to the first machine 102. The first controller 134 causes, based on the fifth input, the first machine to perform the desired operation.

In some examples, the first controller 134 continues operating in the second operating mode to cause the second machine 104 to perform additional desired operations. For instance, the first controller 134 can receive fourth input via a second control of the first machine 120. The second control of the first machine 102 is configured to control a second operation of the first machine while the first controller 134 is operating in the first operating mode. The fourth input can also indicate a second desired operation of the second machine 104. The first controller 134 generates, based on the fourth input, second instructions configured to cause the second machine 104 to perform the second desired operation. As noted above, the first controller 134 generates the second instructions based on mapping the second control to a corresponding control of the second machine 104. The first controller 134 sends the second instructions, via the network 122, to the second controller 134 of the second machine 104. The second controller 134 of the second machine 104 causes the second machine 104 to perform the second desired operation based on the second instructions, as described herein.

In some examples and as noted above, the first controller 134 receives a fourth input indicating one or more desired autonomous operations of the second machine. For instance, the first controller 134 receives the fourth input via a second control of the first machine 102, such as an input device, or a control presented on the display of the first machine. In this example, the display of the first machine 102 comprises a first computing device and a second computing device. The first computing device is associated with a first user interface configured to be displayed by the first controller 134 when the first controller 134 is operating in the first operating mode. The second computing device is associated with a second user interface configured to be displayed by the first controller 134 when the first controller 134 is operating in the second operating mode. The first controller 134 generates, based on the fourth input, second instructions configured to cause the second machine to perform the one or more desired autonomous operations. For instance, as noted above, the second instructions can correspond to a worksite plan and/or an area of the worksite 114 to be worked on by the second machine. The first controller 134 sends, via the network 122, the second instructions to the second controller 134 of the second machine and the second controller 134 causes the second machine to perform the one or more desired autonomous operations based on the second instructions. The first controller 134 of the first machine receives, from the second controller 134 and via the network 122, third information from device(s) of the second machine. As noted above, the device(s) correspond to any sensors 132, location sensor 128, cameras, communication device 124, etc. The third information is associated with the second machine performing the one or more desired autonomous operations. For instance, as noted above, the third information includes KPI's, PI's, and/or various types of data of the second machine. The first controller 134 causes the second computing device of the first machine to display at least a portion of the third information via the second user interface. In some examples, the first controller 134 causes the second computing device to display the third information via the second user interface while simultaneously causing the first computing device to display information associated with operation(s) of the first machine via the first user interface.

Industrial Applicability

The present disclosure describes systems and methods for enabling on-machine remote control to an operator of a machine at a work site 114 for one or more other machine(s). Such systems and methods are used to more effectively operate machines, such as one or more of the machines 102, 104, 106, 108 described above, at a worksite having little or no cell tower coverage and/or wireless connectivity. For example, such systems and methods enable an operator that is manually controlling a machine 102, 104, 106, 108 to remotely operate a second machine on the worksite 114 using one or more controls (e.g., input devices, controls on a user interface) of the machine 102, 104, 106, 108. In some situations, the systems and methods are configured to map control(s) of a first machine to corresponding controls of a second machine. In some situations, such systems and methods enable the second machine to operate in an autonomous mode at a first location while the first machine is being manually operated at a second location on the worksite 114. Additionally, in some situations, feedback is transmitted to the first machine and displayed to the operator of the machine in order to inform the operator of progress of operations, machine diagnostics, and/or completion of an operation.

As a result, use of the systems and methods of the present disclosure reduces the computational resources, control infrastructure, and cost required to perform various operations at the worksite 114, thereby improving the efficiency of the system 100. In particular, the systems described herein can be implemented without using known NLOS systems and corresponding resources. As a result, use of the servers, communication links, physical office structures and/or other components typically associated with such NLOS systems can be avoided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
receiving, by a first controller of a first machine disposed at a worksite, a first input indicating a request to change from a first operating mode in which the first controller is operable to control the first machine to a second operating mode in which the first controller is operable to remotely control a machine disposed at the worksite other than the first machine;
causing, by the first controller and based on the first input, a display of the first machine to present first information indicating one or more additional machines disposed at the worksite;
receiving, by the first controller, a second input indicating a selection of a second machine from the one or more additional machines;
causing, by the first controller operating in the second operating mode and based on the second input, the display of the first machine to present second information captured by a device of the second machine;
receiving, by the first controller, while operating in the second operating mode, and via a control of the first machine, a third input indicating a desired operation of the second machine, the control of the first machine being configured to control an operation of the first machine while the first controller is operating in the first operating mode, and wherein the desired operation comprises causing an autonomous operation for the second machine;
generating, by the first controller and based on the third input, first instructions configured to cause the second machine to perform the desired operation; and
sending, by the first controller and via a network, the first instructions to a second controller of the second machine, wherein execution of the first instructions by the second controller causes the second machine to perform the desired operation.

2. The method of claim 1, wherein the first machine comprises a dozer and the second machine comprises a compactor, and wherein the desired operation comprises a compacting operation performed in a first portion of the worksite while the dozer is operating in a second portion of the worksite.

3. The method of claim 1, further comprising:
displaying a first user interface, via the display, while the first machine is operating in the first operating mode, the first user interface including first information associated with first feedback corresponding to the first machine; and
displaying a second user interface, via the display, while the first machine is operating in the second operating mode, the second user interface including second information associated with second feedback corresponding to the second machine.

4. The method of claim 3, further comprising:
receiving, by the first controller and via a second control of the first machine, a fourth input indicating the desired operation of the second machine;
generating, by the first controller and based on the fourth input, second instructions configured to cause the second machine to perform the desired operation; and
sending, by the first controller and via the network, the second instructions to the second controller of the second machine, the second controller causing the second machine to perform the one or more desired operations based on the second instructions;
receiving, by the first controller and from the second controller, third information from the device of the second machine, wherein the third information is associated with the second machine performing the one or more desired operations; and
causing, by the first controller via the second user interface, the second computing device to display at least a portion of the third information.

5. The method of claim 1, wherein the third input is received through manual adjustment of the control, the control comprising at least one of a lever, a steering wheel, a joystick, a pedal, or a switch of the first machine.

6. The method of claim 1, wherein generating the first instructions comprises mapping the control of the first machine to a second control of the second machine, the second control being configured to control a second operation of the second machine corresponding to the desired operation.

7. The method of claim 1, further comprising:
identifying, by the first controller and based on the first input, the one or more additional machines disposed at the worksite, wherein the one or more additional machines are connected to the network and configured to be remotely controlled by the first machine; and
causing, by the first controller and based on the identifying, the display of the first machine to present the first information.

8. The method of claim 1, further comprising:
receiving, by the first controller and from the second controller, information from the device of the second machine, wherein the information is associated with the second machine performing the desired operation associated with the control; and
causing, by the first controller, the display of the first machine to present at least a portion of the information.

9. The method of claim 8, further comprising:
receiving, by the first controller and via the display of the first machine, a fourth input indicating a second request to change from the second operating mode to the first operating mode in which the first controller is operable to locally control the first machine;
causing, by the first controller and based on the fourth input, the display of the first machine to present third information captured by at least one device of the first machine;
receiving, by the first controller, while operating in the first operating mode, a fifth input indicating a second desired operation of the first machine; and
causing, by the first controller and based on the fifth input, the first machine to perform the second desired operation.

10. The method of claim 8, further comprising:
receiving, by the first controller and via a second control of the first machine, a fourth input indicating a second desired operation of the second machine, the second control of the first machine being configured to control a second operation of the first machine while the first controller is operating in the first operating mode;
generating, by the first controller and based on the fourth input, second instructions configured to cause the second machine to perform the second desired operation; and
sending, by the first controller and via the network, the second instructions to the second controller of the second machine, wherein execution of the second instructions by the second controller causes the second machine to perform the second desired operation.

11. A system, comprising:
a first machine disposed at a worksite, the first machine including a first controller, a display operably connected to the first controller, and a first control operably connected to the first controller, the first control being configured to direct input to the first controller in response to manual manipulation;
a second machine disposed at the worksite, the second machine including a second controller; and
a communication network configured to transmit signals between the first controller and the second controller, wherein the first controller is configured to:
receive a first input indicating a first request to change from a first operating mode to a second operating mode;
cause, based on the first input, the display of the first machine to present first information indicating one or more additional machines disposed at the worksite;
receive a second input indicating a selection of the second machine from the one or more additional machines;
cause, while operating in the second operating mode and based on the second input, the display of the first machine to present second information captured by a device of the second machine;
receive, while operating in the second operating mode and via a control of the first machine, a third input indicating a desired operation of the second machine, the control of the first machine being configured to control an operation of the first machine in the first operating mode, and wherein the desired operation comprises an autonomous operation for the second machine;
generate, based on the third input, first instructions configured to cause the second machine to perform the desired operation; and send, via the communication network, the first instructions to the second controller, wherein execution of the first instructions by the second controller causes the second machine to perform the desired operation.

12. The system of claim 11, wherein the first controller is configured to autonomously control the operation of the second machine by the second controller by:
   generating the first instructions;
   sending the first instructions;
   receiving sensor data of the worksite;
   generating second instructions based at least in part on the sensor data and the desired operation; and
   sending the second instructions to the second controller to cause the second controller to perform one or more actions to fulfill the desired operation.

13. The system of claim 11, wherein generating the first instructions comprises mapping the control of the first machine to a second control of the second machine, the second control being configured to control a second operation of the second machine corresponding to the desired operation.

14. The system of claim 11, wherein the first controller is operable in the first operating mode to control the first machine, and wherein the first controller is operable in the second operating mode to remotely control the second machine.

15. The system of claim 11, wherein the first controller is further configured to:
   receive, from the second controller, third information from the device of the second machine, wherein the third information is associated with the second machine performing the desired operation associated with the control;
   cause the display of the first machine to present at least a portion of the third information;
   receive, via a second control of the first machine, a fourth input indicating a second desired operation of the second machine, the second control of the first machine being configured to control a second operation of the first machine while the first controller is operating in the first operating mode;
   generate, based on the fourth input, second instructions configured to cause the second machine to perform the second desired operation; and
   send, via the communication network, the second instructions to the second controller of the second machine, wherein execution of the second instructions by the second controller causes the second machine to perform the second desired operation based on the second instructions.

16. A machine moveable along a work surface of a worksite, the machine, comprising:
   a frame;
   a power source supported by the frame;
   a work tool coupled to the frame and configured to perform a task at the worksite;
   a controller operably connected to the power source;
   a display operably connected to the controller;
   a communication device operably connected to the controller and communicatively connected to a network; and
   one or more non-transitory computer-readable media storing instructions that, when executed by the controller, cause the controller to perform acts comprising:
      receiving a first input indicating a first request to change from a first operating mode to a second operating mode;
      causing, based on the first input, the display to present first information indicating one or more additional machines disposed at the worksite;
      receiving a second input indicating a selection of a second machine from the one or more additional machines;
      causing, while operating in the second operating mode and based on the second input, the display to present second information received from the second machine;
      receive, while operating in the second operating mode and via a control of the machine, a third input indicating a desired operation of the second machine, the control of the machine being configured to control a corresponding operation of the machine in the first operating mode, wherein the desired operation comprises an autonomous operation for the second machine;
      generate, based on the third input, first instructions configured to cause the second machine to perform the desired operation; and
      send, via the network, the first instructions to a second controller of the second machine, wherein execution of the first instructions by the second controller causes the second machine to perform the desired operation.

17. The machine of claim 16, wherein the machine comprises one of a hauling machine, a loading machine, an excavation machine, or a compacting machine, and wherein the acts to generate the first instructions comprise:
   receiving sensor data from one or more sensors of the first machine or the second machine;
   determining one or more actions for the second machine to perform based at least in part on the desired operation and the sensor data; and
   generating, using the first controller, the first instructions based at least in part on the one or more actions.

18. The machine of claim 17, wherein the third input is received through manual adjustment of the control, the control comprising at least one of a lever, a steering wheel, a joystick, a pedal, or a switch of the machine, and wherein the acts to send the first instructions to the second controller of the second machine comprises causing, by the first controller, the second controller to perform the autonomous operation as directed by the first controller.

19. The machine of claim 16, the acts further comprising:
   receiving, from the second controller, third information from the second machine, wherein the third information is associated with the second machine performing the desired operation associated with the control; and
   causing the display of the machine to present at least a portion of the third information.

20. The machine of claim 19, the acts further comprising:
   receiving, via the display of the machine, a fourth input indicating a second request to change from the second operating mode to the first operating mode in which the controller is operable to locally control the machine;
   causing, based on the fourth input, the display of the machine to present third information captured by at least one device of the machine;
   receiving, while operating in the first operating mode, a fifth input indicating a second desired operation of the machine; and
   causing, based on the fifth input, the machine to perform the second desired operation.

* * * * *